United States Patent [19]
McNulty et al.

[11] Patent Number: 5,645,770
[45] Date of Patent: Jul. 8, 1997

[54] LIQUID COLLECTOR-DISTRIBUTOR DEVICE, SYSTEM AND METHOD

[75] Inventors: Kenneth J. McNulty, Atkinson, N.H.; Neil Yeoman, Merrick, N.Y.

[73] Assignee: Koch Engineering Company, Inc., Wichita, Kans.

[21] Appl. No.: 634,656

[22] Filed: Apr. 18, 1996

Related U.S. Application Data

[63] Continuation-in-part of Ser. No. 576,126, Dec. 21, 1995, abandoned, which is a continuation of Ser. No. 273,359, Jul. 11, 1994, abandoned.

[51] Int. Cl.$^6$ ............................................. B01F 3/04
[52] U.S. Cl. ............................................. 261/97
[58] Field of Search ............................................. 261/97

[56] References Cited

U.S. PATENT DOCUMENTS

| | | | |
|---|---|---|---|
| 4,126,540 | 11/1978 | Grosboll et al. | 261/97 |
| 4,689,183 | 8/1987 | Helms et al. | 261/97 |
| 5,132,055 | 7/1992 | Alleaume et al. | 261/97 |
| 5,464,573 | 11/1995 | Tokerud et al. | 261/97 |

FOREIGN PATENT DOCUMENTS

| | | | |
|---|---|---|---|
| 1383876 | 2/1975 | United Kingdom | 261/97 |

OTHER PUBLICATIONS

Mellatech Column Internals, Sulzar Chemical, Oct. 1992, Bulletin 22.51.06.40–v91–50, 261–97, 24 pages, Koch Packed Tower Internals, Bulletin K1–6, Apr. 1989, 261–97.

*Primary Examiner*—Tim R. Miles
*Attorney, Agent, or Firm*—Richard P. Crowley

[57] ABSTRACT

An integral collector-distributor device including chimney hats and adapted for use in a gas-liquid exchange column to promote radial mixing of a liquid on a distributor tray surface. The collector-distributor device includes a tray having a tray surface adapted to extend generally horizontally across the cross-sectional area of the column to collect downwardly flowing liquid. A plurality of gas risers on the tray permit the upward movement of an upwardly flowing gas through the tray, and a plurality of liquid distributors permit the generally uniform distribution of the collected downwardly flowing liquid to a lower section of the column. A plurality of chimney hats, each having an upper surface and a one and other end, extend over and above at least a portion of the gas risers, are angularly inclined from the horizontal, or are horizontal, collect downwardly flowing liquid on the upper surface and permit the collected liquid on the upper surface to flow away from the point of liquid collection to another section of the tray to promote improved liquid mixing across the tray surface and to reduce liquid concentration gradients on the tray surface. The chimney hats are of a selected width, wider that the width of the gas risers, to provide for minimal space between each adjacent chimney hat. The wide chimney hats, particularly where horizontal, may also be of different selected vertical heights to permit the upward flow of gas.

23 Claims, 7 Drawing Sheets

SECTION E-E

SECTION F-F

LIQUID COLLECTOR-DISTRIBUTOR DEVICE, SYSTEM AND METHOD

REFERENCE TO PRIOR APPLICATIONS

This application is a continuation-in-part application of U.S. patent application Ser. No. 08/576,126, filed Dec. 21, 1995, now abandoned, which application is a continuation application of U.S. patent application Ser. No. 08/273,359, filed Jul. 11, 1994, now abandoned.

BACKGROUND OF THE INVENTION

There are a wide variety of liquid collector and liquid distributor devices for use in gas-liquid exchange columns, such as a packed column. When separate collector-distributor devices are employed, the liquid collected by the collector is fed to a distributor for distribution of the liquid to a lower section of the column, which for example, may be a packed column having random or structured packing therein. The liquid-distributor device employed may be an orifice plate with gas risers, a trough or channel-type, or a tubular-type pipe distributor or other means of distributing the collected liquid. In one form of liquid distributor, there is a central feed trough with a plurality of lateral distribution channels extending outwardly from the sides of the central feed trough, the lateral distribution channels being fed by the central feed trough. Alternatively, the liquid distributor may comprise a plurality of spaced-apart, generally parallel lateral distribution channels extending substantially across the cross-sectional area of the column and being fed by one or more feed troughs positioned above the lateral distribution channels.

When separate collector and distributor devices are employed, typically the liquid becomes well-mixed as it flows to the feed box of the distributor device. However, in order to reduce column height and to save cost, integral collector-distributor devices rather than separate devices are employed; however, in such integral collector-distributor devices the liquid mixing may not be as efficient as in separate devices, and may, in fact, be poor, especially in large diameter columns, for example, over 10 or 12 feet in diameter.

One prior art collector-distributor device includes a centrally disposed central channel distributor, which is fed liquid by a downcomer from an overlying tray deck, and which includes a plurality of spaced-apart, generally parallel, channel distributors extending therefrom, and with the channel distributors placed below the tray deck, which is fitted with a plurality of gas risers, such as, for example, circular gas risers extending substantially across the cross sectional area of the tray deck and extending upwardly therefrom, generally uniformly dispersed above the spaces between the lateral channels of the distributor means below to permit the upward flow of gas through the tray deck. In such collector-distributors the gas risers therefore extend upwardly from the tray deck. The gas risers may include horizontal chimney hats or troughs over the top of the gas risers and spaced slightly apart therefrom to prevent descending liquid from falling through the risers, and to bring the collected liquid to the tray surface so that it can be delivered to the central channel of the underlying distributor means via a downcomer extending downward from the tray deck. When the gas risers are individual, circular gas risers, the chimney hats may be circular hats placed over each gas riser; however, where the gas risers are rectangular-type gas risers, the chimney hats may include elongated rectangular chimney hats or troughs which are generally extended over the top surface of the rectangular risers or over a row of circular risers and are generally rectangular trays with upturned edges, which are horizontal, that is, parallel to the main collecting tray surface, which direct collected liquid to the main collecting surface.

Another prior art collector-distributor device is illustrated and described in a 1989 Koch Engineering Company, Inc.'s "Packed Tower Internals" publication, wherein a liquid distributor is shown with circular gas risers and flat, horizontally aligned rectangular chimney hats which are generally spaced over the top surface of the circular risers.

It is desired to provide for a new, integral collector-distributor device for use in a gas-liquid exchange column, to promote selected radial distribution of a collected liquid on a tray surface, to avoid liquid concentration gradients across the tray surface and to provide a system including such integral liquid distributor-collector devices and a method of promoting radial dispersion of liquid and preventing liquid concentration gradients across the tray surface without impeding the upward flow of gas in the column.

SUMMARY OF THE INVENTION

The invention relates to an integral liquid distributor-collector device suitable for use in a gas-liquid exchange column, to systems including such liquid distributor-collector devices and to a method of promoting radial mixing of a collected liquid in a gas-liquid exchange column.

The invention comprises an integral collector-distributor device suitable for use in a gas-liquid exchange column, particularly, but not limited to, large diameter columns to promote radial distribution of a liquid collected on a tray surface and to reduce and avoid liquid concentration gradients on the tray surface. The integral collector-distributor device comprises a tray suitable for use in a gas-liquid exchange column and having a tray surface which extends generally horizontally across the cross-sectional area of the column. The tray includes a plurality of gas risers on the tray to permit the upward movement of gas through the tray and extending above the liquid level of collected liquid on the tray surface, which may comprise, for example, but not be limited to, separate, circular, rectangular, or otherwise formed upwardly extending gas risers of suitable height to direct the gas above the liquid surface collected on the tray. The integral collector-distributor device also includes a plurality of liquid-distributors, for example, a plurality of holes in the collector tray decks, or one or more central distribution troughs and a plurality of spaced-apart, generally parallel, generally perpendicularly extending lateral distribution channels extending from the central trough and connected therewith, or other arrangements of weirs or troughs to collect the liquid on the tray surface and to permit the passage of the downwardly flowing liquid to a lower section of the column, and to generally uniformly distribute such collected liquid over the cross sectional area of the column to the lower section of the column.

The collector-distributor device of the invention includes a plurality of chimney hats having an upper surface and one and an other end and extending over and slightly spaced-apart from the gas risers, and in one embodiment the chimney hats are angularly disposed from the horizontal axis of the column to direct collected liquid on the hat surface as desired. The chimney hats may extend over a portion, such as from the center or outwardly, or laterally from side to side of the column to permit collected liquid received in one portion of the column and collected on the upper surface of the chimney hats to flow by gravity away from the point of liquid collection to another section of the column, typically the sides of the column, that is from side to side or from center to side, to promote liquid mixing across the tray surface, and to reduce the liquid concentration gradient on the tray surface.

In another embodiment of the invention, the chimney hats have widths which extend beyond the widths of the underlying gas risers and extend toward adjacent chimney hats, to provide for the upper surfaces of the chimney hats to cover a greater cross-sectional area of the tray surface than the area of the gas risers, and, for example, to cover usually at least 30 per cent or more of the cross-sectional area of the total tray surface. The chimney hats are designed to collect the downwardly flowing liquid on the upper surface and to direct the collected liquid toward the periphery of the tray to provide mixing of the liquid that was flowing downward toward the center of the column with that which was flowing downward at the periphery of the column.

The invention concerns a collector-distributor device for use in a fluid exchange column, the column having an interior vertical surface and a horizontal cross-sectional area, to promote radial mixing of liquid on a tray surface without impeding upward gas flow. The device comprises a tray having a tray surface arranged and constructed to extend generally horizontally across the cross-sectional area of the column, to collect downwardly flowing liquid on the tray surface prior to its being distributed to a lower section of the column.

A plurality of gas riser means are positioned on the tray, covering a minor portion of the cross-sectional area of the tray surface, to provide for the upward movement of an upwardly flowing gas in the column and through the tray. A liquid distributor means provides for the generally uniform distribution of the liquid on the tray surface to a lower section of the column.

The device includes at least one chimney hat means having a first and second end and an upper surface to collect downwardly flowing liquid and distribute to one or both ends. The chimney hat means extends over the plurality of gas risers, and is generally vertically spaced apart therefrom. The chimney hats allow the collected liquid to be distributed to the tray surface in a controlled manner. The collected liquid comprises downwardly flowing liquid directly collected on the tray surface, downwardly flowing liquid collected and distributed onto the tray surface by chimney hat means, and downwardly flowing liquid arriving at the tray surface from the interior surface of the column shell.

The chimney hat means have widths which extend beyond the widths of the underlying gas risers and extend toward adjacent chimney hat means, to provide for the upper surfaces of the chimney hats to cover at least a portion of what would otherwise be the liquid collecting means and to cover at least 30 per cent of the cross-sectional area of the tray surface, the chimney hat means designed to collect the downwardly flowing liquid on the upper surface and to direct the collected liquid toward the periphery of the tray, to provide radial mixing of the more centrally collected downwardly flowing liquid and the liquid downwardly flowing on and near interior surface of the column shell.

It has been found that in current devices most of the downwardly descending liquid on the tray falls directly onto the tray surface, and that the chimney hats, or troughs, covering the gas risers, do not collect enough liquid on the upper surface of the hats, particularly where, as usually constructed and designed, the width of the hats or troughs are relatively narrow, being only wide enough to just cover or be slightly wider than the gas risers to prevent downward flowing liquid from entering the open tops of the gas risers. In one example, the gas risers usually are three- or four-inch diameter pipes or three or four inch wide rectangular troughs. The total cross-sectional area of the gas risers would typically represent only about 10 to 15 percent of the overall cross-sectional area of the tray surface. Therefore, most of the downwardly flowing liquid would flow in between the gas risers and directly on to the tray surface for distribution. Generally, the total amount of the tray surface covered by gas risers and the hats that cover them would not exceed 25 or 30 percent, at the most, of the cross-sectional area of the tray.

Therefore, in another embodiment, it is desirable to widen considerably the chimney hat means wherein the chimney hat means are either horizontal or angularly inclined, or a combination thereof. The chimney hat means may be horizontal, so that the horizontal chimney hat means would direct liquid generally equally to both sides, and therefore promote radial mixing.

In order to prevent any restriction in the upward flow of gas, the horizontal chimney hats or the inclined chimney hats may be spaced apart vertically at different height levels, for example, 3 to 12 inches or more in difference, to provide a vertical space between adjacent chimney hats, for gas flow, which would work with any horizontal space between chimney hats to ensure gas flow is not unduly restricted. For example, two or more separate equal or non-equal levels or more can be selected. The chimney hat means can be arranged horizontally across the tray, for example, alternatingly with vertical spaces either uniform or non-uniformly between each chimney hat to provide for the unrestricted upward flow of gas. Where inclined chimney hats are used, and the inclined chimney hats are alternately and sequentially arranged, gas flow restriction is not a particular problem, since the angular difference provides inclined vertical spaces for the gas to escape.

Most of the difference concerning radial mixing of a liquid in a column comes from the different histories of the liquid that is derived from the center and the liquid derived from the edge; that is, the liquid which flows down the inside wall surface of the column shell, versus the liquid which is in the center, and therefore these liquids should be mixed. One purpose is to direct liquid on the tray from the center to the column sides, and then to direct the mixed side and the center liquid inwardly to achieve liquid radial mixing on the tray surface prior to distribution. The cross-sectional area of the chimney hat means; that is, the length and width, can therefore extend to a substantial portion of the cross-sectional area of the tray, provided only that there is a means for the gas to escape without creating any gas flow impediment or gas backpressure problems.

The basic concept is to extend the width of the chimney hats beyond the width needed for protection of the risers from the downwardly flowing liquid to cover at least about 30%, usually 50–70% or more, of the cross-sectional area of the tray surface, and also extend the differences in heights of the chimney hats, particularly where horizontal chimney hats are used. The length of the chimney hats generally extends over the length of the gas risers and usually substantially across the tray surface. The chimney hat means should merely collect as much downwardly flowing liquid as possible, without impeding upward gas flow, and direct the liquid collected from the center toward the outside of the tray and toward the inside wall surface of the column shell, and then to permit the liquid to flow back across the tray surface to promote radial mixing. One preferred arrangement is either horizontal chimney hats with varying heights, or alternating inclined chimney hats, both of which provide for escape of gas. Differences in the vertical heights of the chimney hats can vary, for example, from 3–12 inches or more. It is desired to provide a highest percentage of the tray surface, for example usually, at least a majority, to be covered by the chimney hat means, and yet to permit the gas to escape upwardly.

The invention includes a gas-liquid exchange system, such as a packed gas-liquid column, which includes at least one, and often a plurality of vertically spaced-apart, integral, liquid distributor-collector devices of the invention, when random or structured packing or both is disposed between the integral liquid distributor collector devices of the column. Typically, such exchange columns include an inlet in an upper section for the introduction of a liquid to be distributed, collected, and redistributed throughout the column; an inlet in a lower section for the introduction of an upwardly flowing gas to pass upwardly though the column; an outlet at the upper section of the column for the removal of the gas; and an outlet at the lower section for the removal of the liquid. Liquid collector-distributor devices of the invention are particularly adapted for use, but not solely, in large diameter columns where separate collector and distributor devices would increase the height of the column or reduce the height available for packing. The tray and the tray deck used in the collector-distributor device may include a top tray surface, and which tray surface may be solid or may, in one embodiment, contain a plurality of holes therein for liquid distribution. The gas risers employed in the device may include upwardly extending gas risers, either rectangular, circular, or in other forms or shapes, extending upwardly a defined height from the tray surface. The tray or tray deck may also include a plurality of distributor troughs extending below the tray surface, with a central trough or a plurality of lateral troughs, with the troughs having holes therein either in the bottom or the sides, or other devices to permit the collected liquid in the lateral and central troughs to be uniformly distributed to the next lower section of the column. Usually, the gas risers above the tray deck should be located midway between adjacent liquid distribution channels below the tray deck.

If the tray comprises a solid tray deck, then the gas risers are typically comprised of upwardly extending gas risers extending upwardly from the tray deck surface. The tray deck may also comprise a plurality of holes, which holes may act also as a means of distributing collected liquid on the tray deck surface to an underlying section of the column. The chimney hats employed to cover the gas risers should preferably have outwardly turned up edges to contain the flow of liquid on the upper surface of the chimney hat as it flows toward the one or both ends of the chimney hat. Generally, the chimney hats would form elongated, rectangular troughs or hats over the gas risers, even where the gas risers are circular risers, they can be tilted from the horizontal to preferentially transport liquid in one direction if that is desired.

Depending on the liquid maldistribution on the tray surface, the tilt or incline of the chimney hats may be varied to promote the desired liquid mixing. Usually liquid concentration gradients occur because of different flow patterns at or near the interior or side walls of the exchange column shell, thus there tends to be a liquid concentration gradient extending from the center outwardly, particularly as the column extends outwardly in diameter. Thus, as it is often required to promote radial mixing of the collected liquid from the center outwardly, or from side to side in one embodiment, adjacent chimney hats may be tilted in opposite directions in alternating sequence across the cross sectional area of the column from side to side or from center to side to side to give equal hydraulic flow in both the east-west and north-south directions. Generally, liquid flow in the east-west direction causes some mixing in the north-south direction and vice versa, but not always enough to prevent concentration gradients.

The chimney hats are positioned slightly above the gas risers, e.g. 2 to 12 inches, and typically can be arranged in one embodiment in a spaced-apart arrangement, that is, to be of a width and spaced apart horizontally from each other. Although not all of the descending liquid is collected onto the upper surface of the chimney hats, it is recognized that the width and/or the length of at least the tilted chimney hats may be increased, for example, in width, until they almost touch each other, so that almost all of the downwardly descending liquid may be collected on the upper hat surface and transported in a desired direction, either by a horizontal, inclined or combination of chimney hats. When the chimney hats are tilted in opposite directions, typically in an alternating, sequential fashion, these wide chimney hats would not close off gas flow, but would present to the gas-liquid flow a projection similar to the projection of equipment for static mixing, and provide space between the offset angular hats for the unimpeded upward flow of the gas. The chimney hats may include an elongated, rectangular hat of varying and desired length which extends from the center outwardly toward the sides of the column, and may extend from side to side of the column, or may be a peaked hat inclined from about the center of the column outwardly, with the high end being toward the center forming a continuous v-shaped chimney hat. Chimney hats may be used in various arrangements, positions and combinations to promote the desired radial mixing of the collected liquid and to correct any concentration gradient. Chimney hats may be disposed directly over the gas risers, for example, at a particular angle to the gas risers on the tray or may be generally parallel and directly over the gas risers. The angle of the inclination from the horizontal, where used, may vary in each hat as desired, but typically the hats would range from 1° to 3° inclination to as much as 15° from one end to the other end of the chimney hat. The angle should be selected based on liquid flow, mixing requirements, gas flow, and tower diameter.

The invention will be described for the purposes of illustration only in connection with certain embodiments; however, it is recognized that various modifications, changes, additions and improvements may be made to the illustrated embodiments without departing from the spirit and scope of the invention.

DESCRIPTION OF THE EMBODIMENTS

Figure 1:
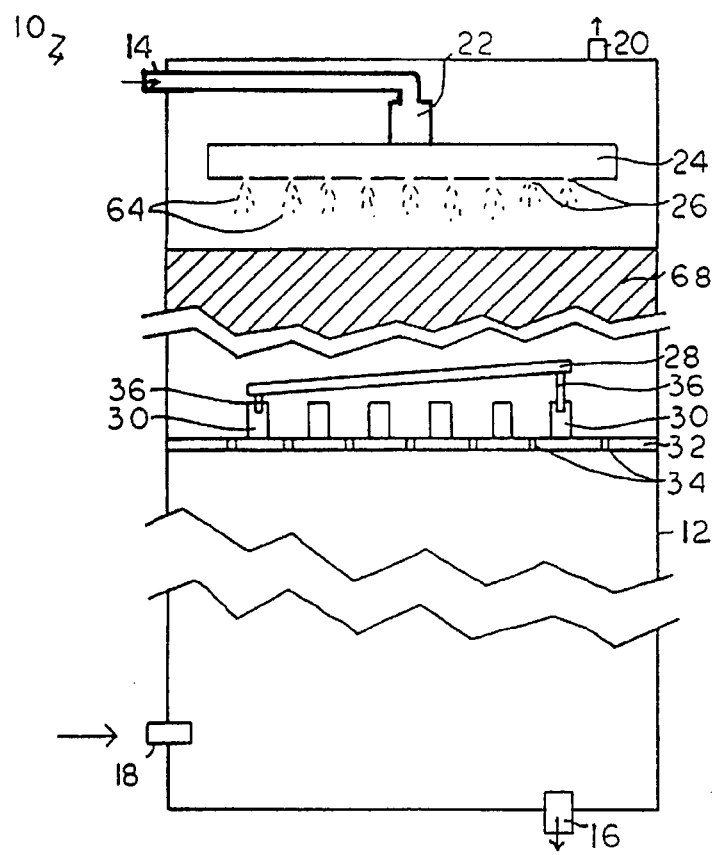
FIG. 1 is a schematic illustration of a gas-liquid exchange column containing a collector-distributor device of the invention.

With reference to the drawings, FIG. 1 shows one type of gas-liquid exchange column system 10 with a column 12 having a liquid inlet 14 which allows for the introduction of a liquid to be distributed throughout the column, a gas inlet 18 for the introduction of an upwardly flowing gas to pass upwardly through the column and to be removed through gas outlet 20, with the liquid 64, for example, being removed at the bottom of the column 12 through liquid outlet 16. A central distribution trough 22 connected to a plurality of lateral distribution troughs 24 with openings on the bottom 26 permit the passage of the downwardly flowing liquid 64 through a packed bed 68 to the lower section of the column and the integral liquid collector-distributor device. A plurality of chimney hats 28 of the invention are angularly disposed, for example, 1°-5° from the horizontal axis of the column, and extend over a portion of the inside of the column and are placed in a selected manner to permit collected liquid received in one portion of the column and collected on the upper surface of the chimney hats to flow by gravity away from the point of liquid collection to another area of the column, to promote liquid mixing and to reduce the liquid concentration gradient on the tray surface 32. The tray surface has a plurality of holes 34 generally uniformly distributed to permit the passage of the liquid further down the column. Circular gas risers 30 permit the upward flow of gas through the gas risers, which gas risers 30 are generally uniformly distributed across the tray surface 32. The chimney hats 28 are secured to the gas risers 30 with vertically extending struts 36 which are placed at selected heights to provide for the angular disposition of the chimney hats.

Figure 2:
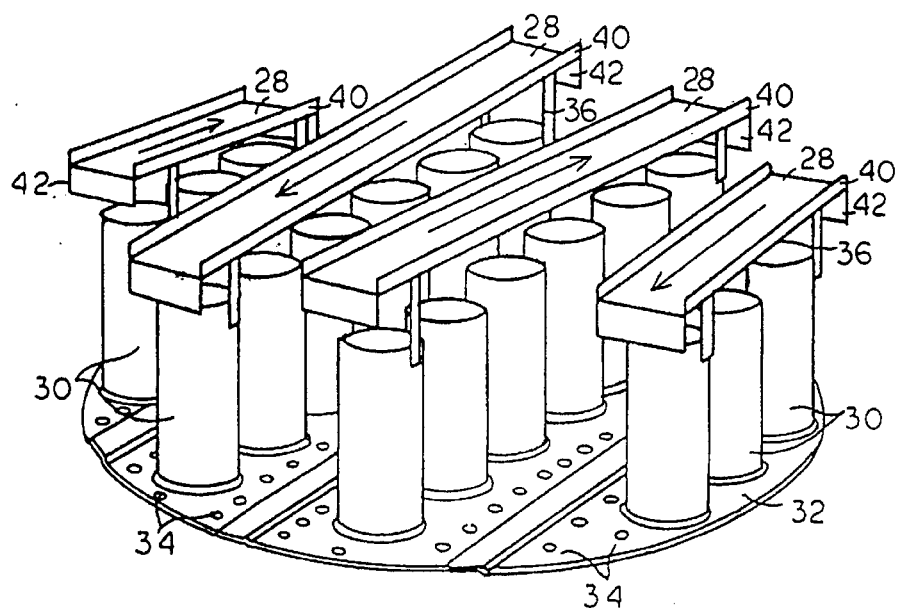
FIG. 2 is a perspective view from above of an integral collector-distributor as shown in FIG. 1.

As shown in FIG. 2, the chimney hats 28 have upwardly turned side edges 40 and downwardly turned ends 42 to further contain and direct the liquid to the low end of the chimney hat and to the sides of the column 12. In FIG. 2, the chimney hats 28 are shown in alternating angular dispositions to permit better liquid flow distribution, the liquid flow distribution being indicated by arrows, with vertical struts 36 supporting the chimney hats attached to gas risers 30 placed on top of the collecting tray 32. A plurality of holes 34 are located on the tray 32 to permit passage of the liquid through the tray into the underlying section of the column 12.

Figure 3:
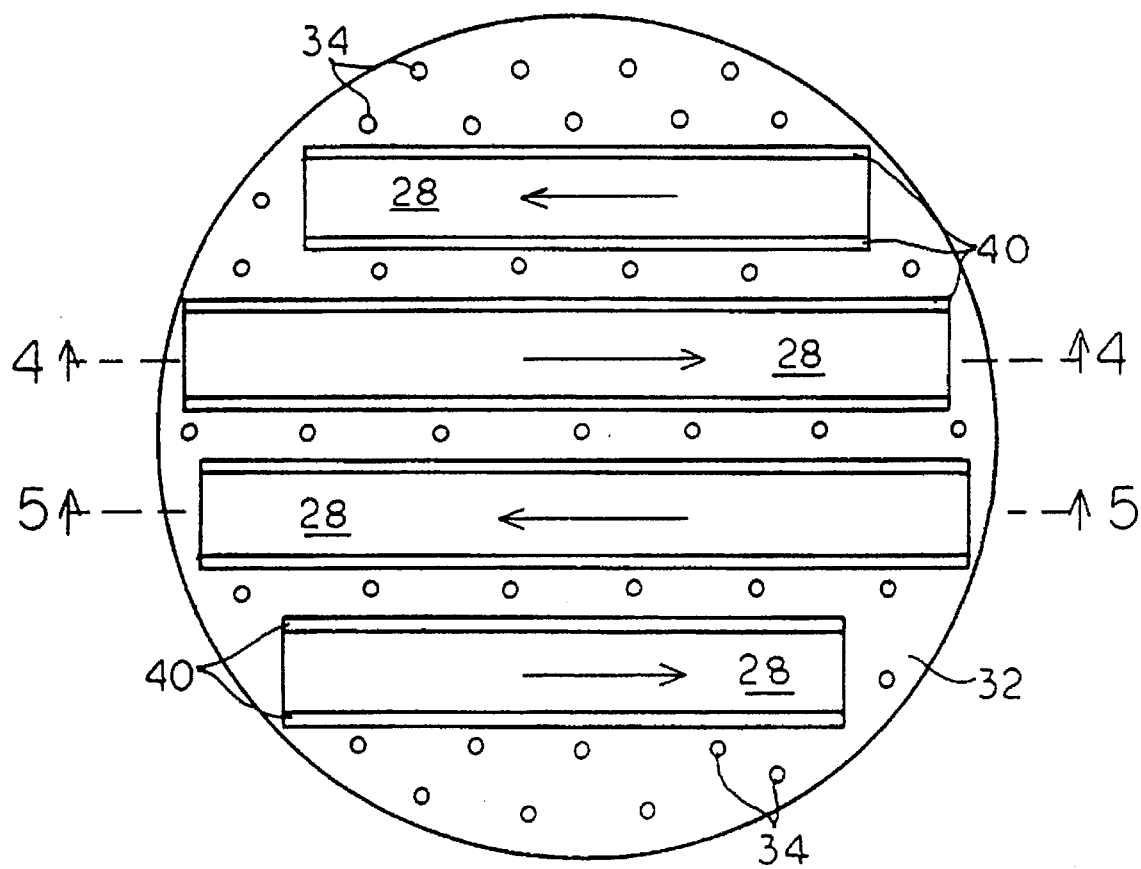
FIG. 3 is a plan view of the collector-distributor device of FIG. 2.
Figure 4:
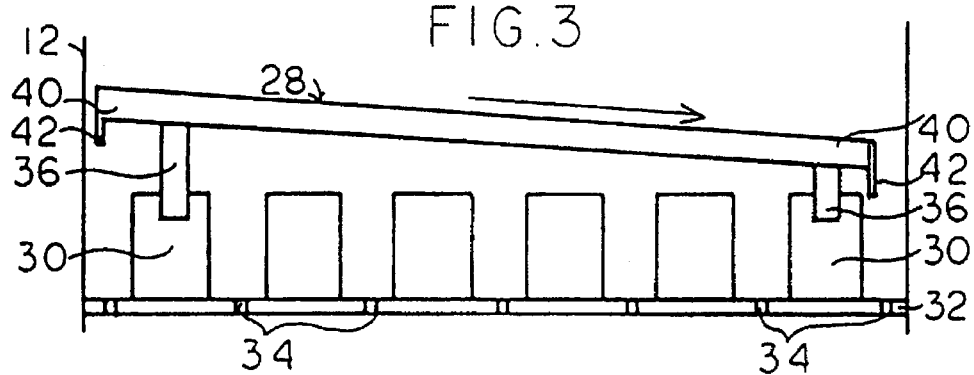
FIG. 4 is a sectional view of the integral collector-distributor of FIG. 2 along line 4—4.
Figure 5:
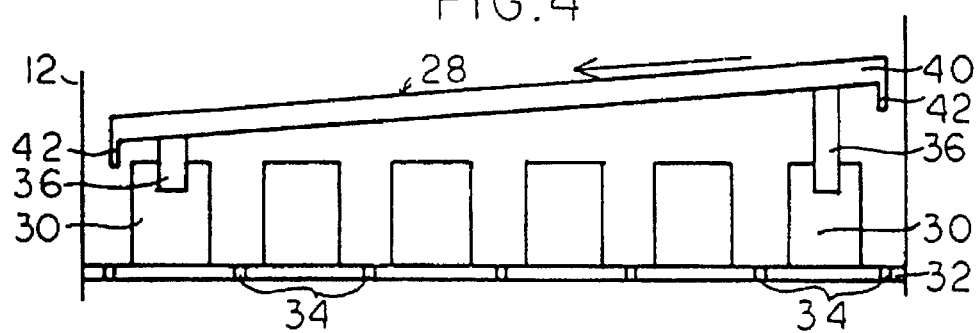
FIG. 5 is a sectional view of the collector-distributor device as shown in FIG. 2 along line 5—5.

FIG. 3 shows the configuration of FIGS. 1 and 2 in plan view, with chimney hats 28 angled for liquid flow distribution, the flow indicated by arrows, with upturned side edges 40 to contain and further direct the liquid flow, and surface tray 32 with liquid distribution holes 34. FIGS. 4 and 5 are sectional views of the chimney hats 28 in opposing directions, with the liquid flow indicated by arrows, the hats having upturned edges 40, and downwardly turned ends 42. Struts 36 are attached to gas risers 30, the risers spaced apart on the tray 32 with holes 34. The alternatingly angled chimney hats allow for a substantial increase in radial liquid distribution throughout the tray surface in the column.

Figure 6:
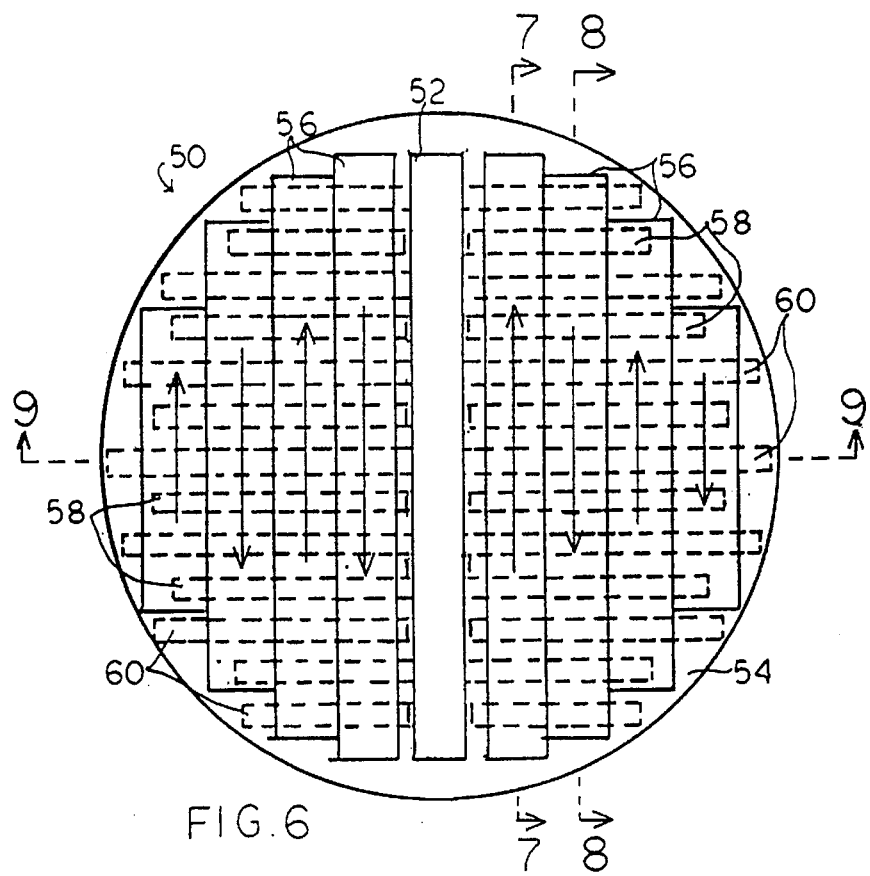
FIG. 6 is a plan view of another embodiment of an integral collector-distributor device containing the collector-distributor device of the invention.
Figure 7:
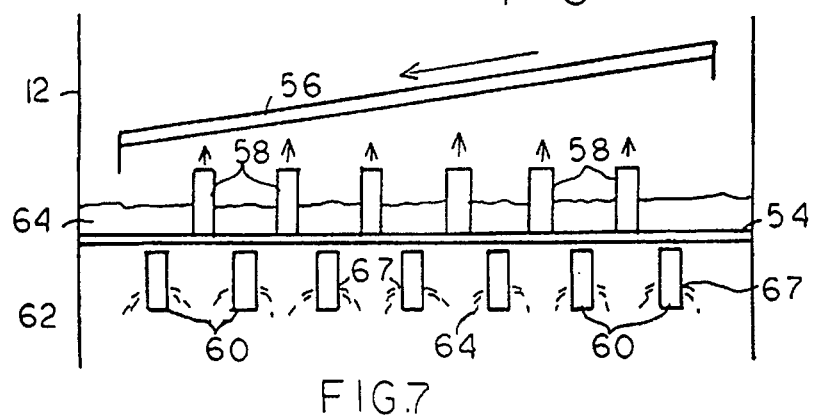
FIG. 7 is a sectional view of the collector-distributor of FIG. 6 along line 7—7.
Figure 8:
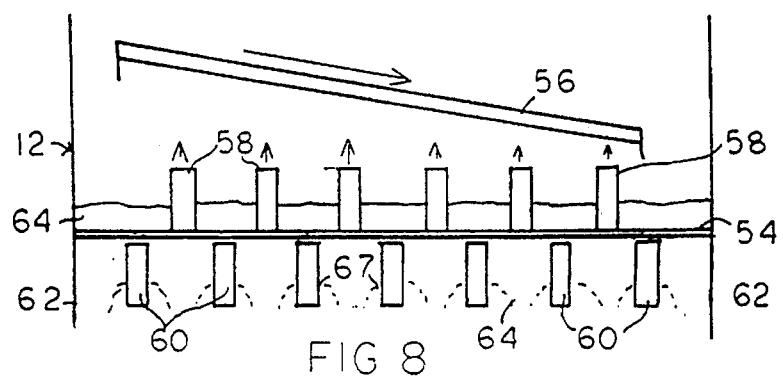
FIG. 8 is a sectional view of the collector-distributor device of FIG. 6 along line 8—8.
Figure 9:
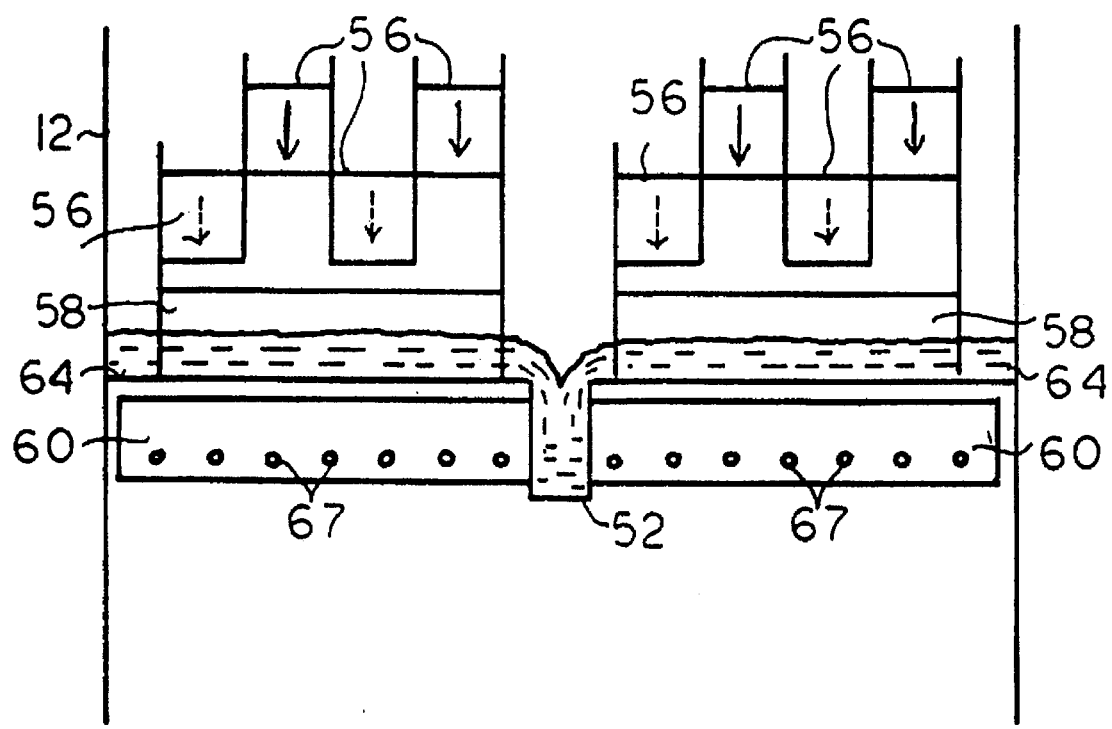
FIG. 9 is a sectional view of the collector-distributor of FIG. 6 cut along lines 9—9.

FIG. 6 shows another embodiment of the invention 50 with a central distribution trough 52 which receives liquid from the collector tray 54 and feeds it to the lateral distribution channels 60. Chimney hats 56 are placed in a close, aligned manner and in opposing angular dispositions above the gas risers 58 to provide for more even distribution of the liquid onto the liquid collector tray 54. Gas riser troughs 58 are positioned perpendicular to the chimney hats and in a parallel, alternating sequence to the distribution channels 60 located underneath the collector tray 54. The liquid collector tray 54 permits the passage of liquid 64 into the central distribution trough 52 which feeds that liquid into the distribution channels 60, where it is distributed by means of drip holes 67 to pass further down the column. As shown in sectional views FIGS. 7, 8 and 9, the alternatingly angled chimney hats 56 within the column 12 direct the liquid 64 and liquid flow, as indicated by arrows, onto the collector tray 54 and into the central distribution channel 52, where the liquid passes further into the liquid distributor channels 60 and then further down the column. In FIG. 6, chimney hats are shown perpendicular to the gas risers, but they could also be at any other angle, including parallel.

In another embodiment not shown, a central distribution trough is not used, and the chimney hats of the invention disperse the flow of liquid directly onto the liquid-collector tray deck, said tray deck having holes therein for the introduction of liquid into the distribution troughs underneath the tray, which troughs extend over the entire cross section of the tower. The troughs are positioned perpendicular to the chimney hats and in a parallel, alternating sequence to the distribution channels located underneath the tray. This optional embodiment may be used, for example, as a substitute for the embodiment shown in FIGS. 3, 4 and 5, when there are hydraulic gradients on the deck that would produce different flows from holes in different parts of the deck. The use of troughs would tend to even out the hydraulic gradients and give a more even distribution.

Figure 10:
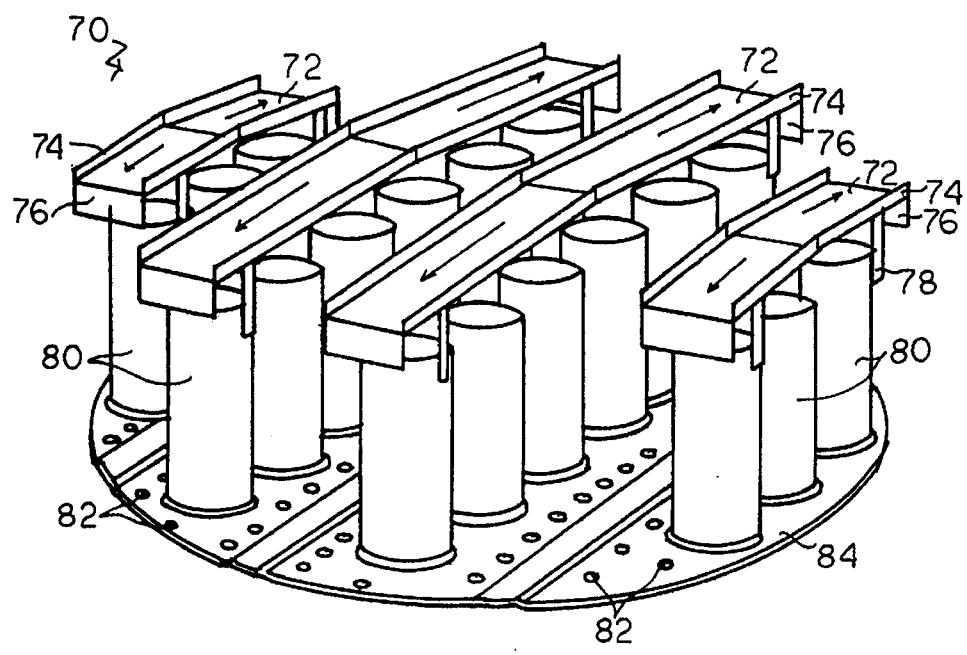
FIG. 10 is a perspective view from above of a further embodiment of the collector-distributor device of the invention.

FIG. 10 shows a perspective view of another configuration of the collector-distributor device of the invention 70 with chimney hats 72 comprising both angles in one, to permit liquid flow distribution in both directions, as indicated by arrows, on each chimney hat. The chimney hats 72 have upturned side edges 74 and downwardly turned ends 76 to provide for further containment and flow distribution of the liquid as desired to meet the liquid mixing requirements. Struts 78 space the chimney hats and secure them to the gas risers 80 positioned on the liquid collector tray 84 with holes 82.

Figure 11:
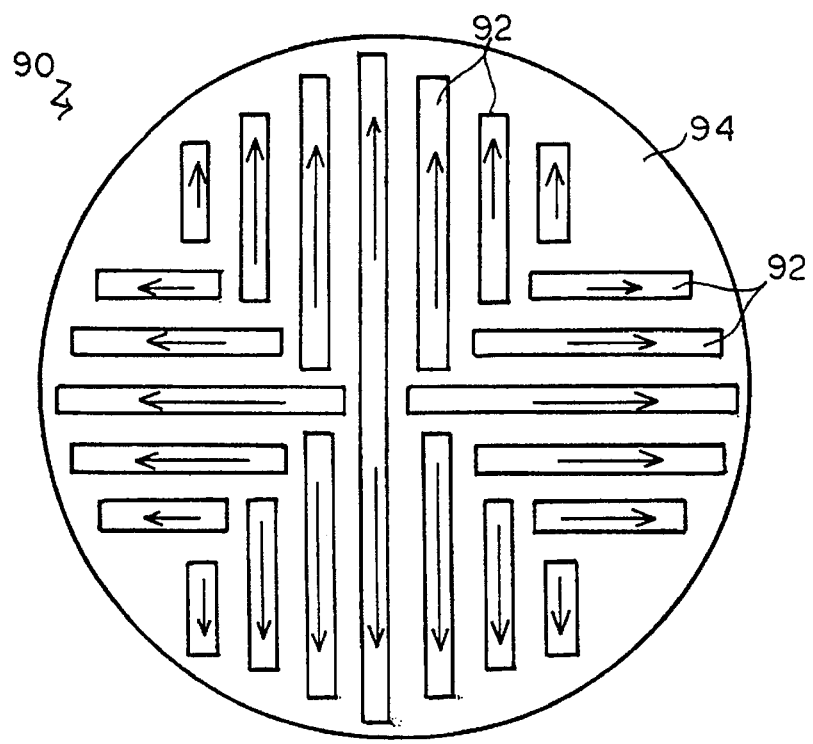
FIG. 11 is a plan view of a further embodiment of the collector-distributor device of the invention.

FIG. 11 shows a plan view of a further configuration of the collector-distributor chimney hats of the invention 90 with chimney hats 92 disposed in alternating angular dispositions, indicated by arrows, on the collector tray 94.

Figure 12:
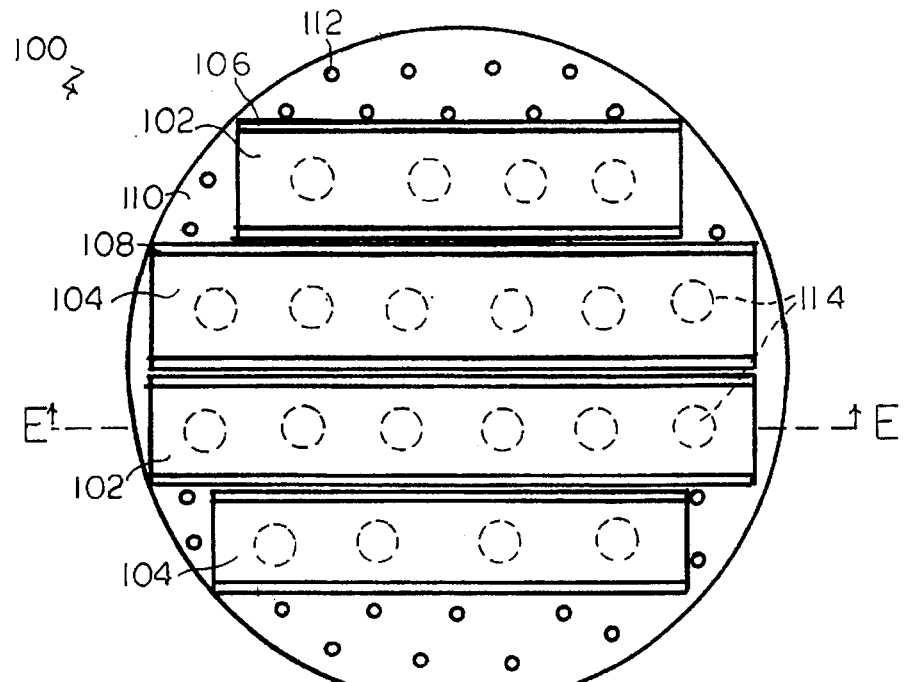
FIG. 12 is a top plan view of another embodiment of the invention, with widened chimney hats in a horizontal configuration at different vertical heights.

FIG. 12 shows another embodiment of the chimney hat configuration 100 in top plan view, with chimney hats 102 and 104 having increased width, and with chimney hats 102 being of a lesser vertical height that chimney hats 104. Upturned side edges 106 and 108 on the respective chimney hats contain and further direct the liquid flow. FIG. 12 also shows tray surface 110 with liquid distribution holes 112, and gas risers 114 are indicated in broken line.

Figure 13:
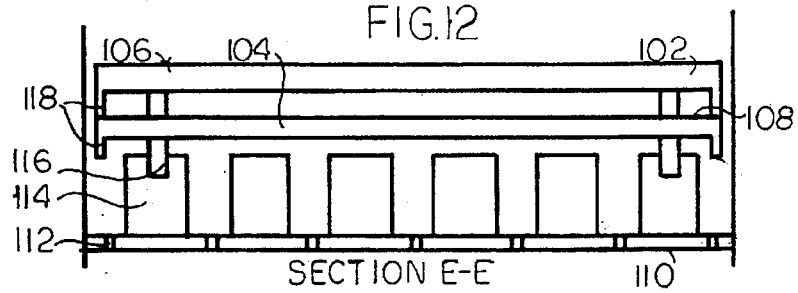
FIG. 13 is a section view of FIG. 12 cut along line E—E.

FIG. 13 is a side sectional view of the chimney hats 102 and 104 at different vertical heights, the hats having upturned edges 106 and 108 respectively, and downwardly turned ends 118. Struts 116 are attached to gas risers 114, the risers spaced apart on the tray surface 110 with holes 112. The alternating vertical heights of the chimney hats provide space for the upward passage of gas flow from the risers to the packing above the collector.

Figure 14:
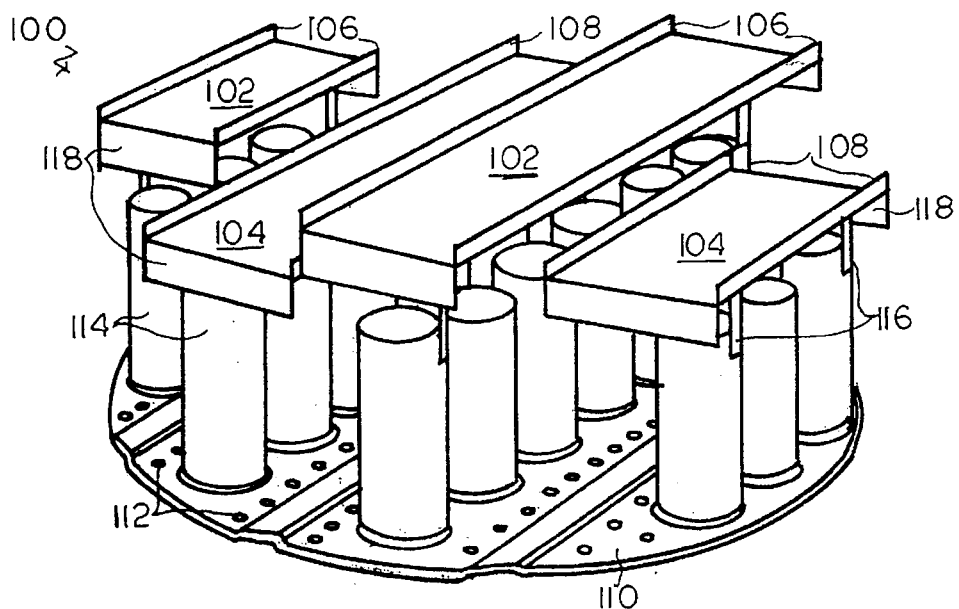
FIG. 14 is a perspective view of the embodiment of FIG. 12.

As shown in perspective view in FIG. 14, the chimney hats 102 and 104 have upwardly turned side edges 106 and 108 respectively and downwardly turned ends 118 to further contain and direct the liquid to the periphery of the column. In FIG. 14, the chimney hats 102 and 104 are shown in alternating vertical heights, with vertical struts 116 supporting the chimney hats attached to gas risers 114 placed on top of the collecting tray 110. A plurality of holes 112 are located on the tray 110 to permit passage of the liquid through the tray into an underlying zone of the column.

Figure 15:
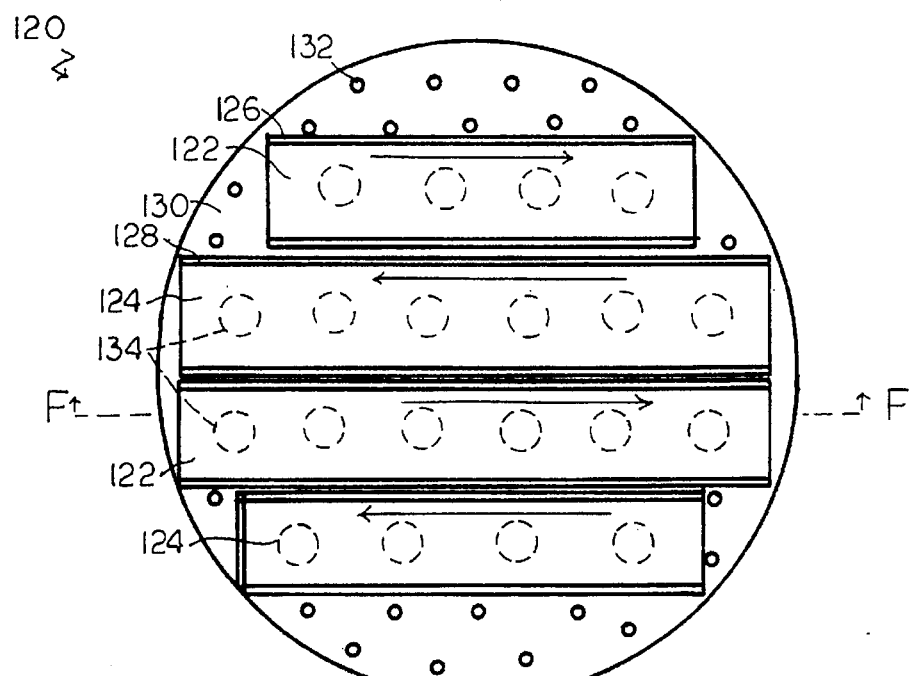
FIG. 15 is a top plan view of another embodiment of the invention, with widened alternatingly inclined chimney hats, with arrows indicating the direction of inclination of the hats.

FIG. 15 shows another embodiment of the chimney hat configuration 120 in top plan view, with chimney hats 122 and 124 having increased width, and with the chimney hats alternately angled for liquid flow distribution, the flow indicated by arrows. Upturned side edges 126 and 128 on the respective chimney hats contain and further direct the liquid flow. FIG. 15 also shows tray surface 130 with liquid distribution holes 132, and gas risers 134 are indicated in broken line.

Figure 16:
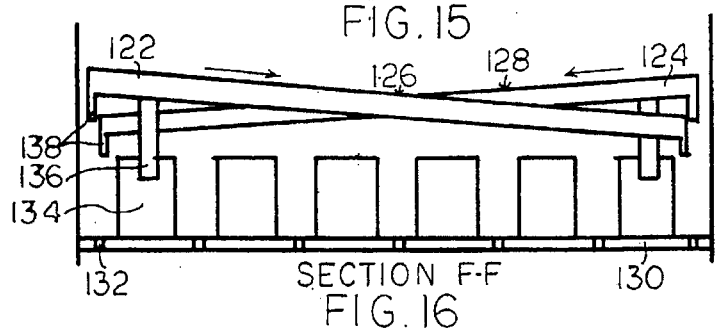
FIG. 16 is a sectional view of FIG. 15 cut along line F—F.

FIG. 16 is a side sectional view of the chimney hats 122 and 124 alternately angled for liquid flow distribution, the flow indicated by arrows, the hats having upturned edges 126 and 128 respectively, and downwardly turned ends 138. Struts 136 are attached to gas risers 134, the risers spaced apart on the tray surface 130 with holes 132. The alternating angles of the chimney hats allow for a substantial increase in radial liquid distribution throughout the tray surface in the column and provide space for the upward passage of gas.

Figure 17:
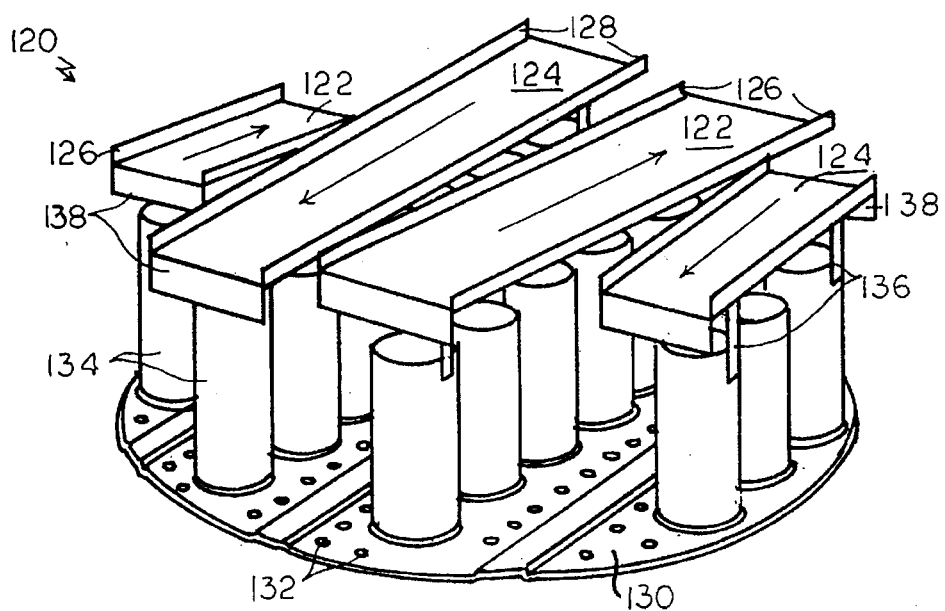
FIG. 17 is a perspective view of the embodiment of FIG. 15.

As shown in perspective view in FIG. 17, the chimney hats 122 and 124 have upwardly turned side edges 126 and 128 respectively and downwardly turned ends 138 to further contain and direct the liquid to the sides of the column. In FIG. 17, the chimney hats 122 and 124 are shown in alternating angle configurations, with vertical struts 136 supporting the chimney hats attached to gas risers 134 placed on top of the collecting tray 130. A plurality of holes 132 are located on the tray 130 to permit passage of the liquid through the tray into a further area of the column.

In operation, in a column or tower containing a gas-liquid exchange system, a downwardly flowing liquid and an upwardly passing gas is introduced into the column and the liquid flow is directed by the alternatingly angled, spaced-apart chimney hats which direct the flow onto a liquid collector tray in a dispersed manner with minimal liquid concentration gradients across the tray surface.

Further, the widened-width chimney hats, in either the angled or alternating vertical height configurations, allow for maximum collection of the liquid onto the chimney hat surfaces for better dispersion, rather that having an increased amount of liquid fall directly onto the tray surface. The spaces provided by these alternate configuration allows for the gas flow to remain unimpeded as it passes upwardly through the column.

The gas-liquid exchange occurs in the column both above and below the collector-distributor with eventual removal of the gas or vapor from the top of the column and liquid from the bottom. The versatility of configurations and angles of inclination of the chimney hats above the gas risers within a packed tower or column allow for a variety of applications for the liquid collector-distributor device of the invention, as the chimney hats can be placed and angled as desired for maximum effect depending on the requirements of the liquid flow and mixing.

What is claimed is:

1. A collector-distributor device for use in a fluid exchange column, said column with a shell having an interior vertical wall surface and a horizontal cross-sectional area, to promote radial mixing of liquid on a tray surface without impeding upward gas flow, which device comprises:

a) a tray having a tray surface arranged and constructed to extend generally horizontally across said cross-sectional area of said column, to collect downwardly flowing liquid on said tray surface prior to its being distributed to a lower section of the column;

b) a plurality of gas riser means on said tray to provide for the upward movement of an upwardly flowing gas in said column and through said tray;

c) liquid distributor means to provide for the generally uniform distribution of said liquid on said tray surface to a lower section of said column;

d) chimney hat means having a first and second end and an upper surface to collect and distribute downwardly flowing liquid on said upper surface, said chimney hat means extending over said plurality of gas risers and generally vertically spaced apart therefrom;

e) said tray surface having the collected liquid on the tray surface to be distributed to a lower section of the column, comprising:

i) downwardly flowing liquid directly collected on the tray surface;

ii) downwardly flowing liquid collected and distributed onto the tray surface by chimney hat means; and iii) downwardly flowing liquid on the tray surface from the interior surface of the column shell; and f) said chimney hat means having widths which extend beyond the widths of said underlying gas risers and extending toward adjacent chimney hat means, to provide for said upper surfaces of said chimney hats to cover at least 30 percent of said cross-sectional area of said tray surface, said chimney hat means positioned at different vertical heights above said gas risers to permit the upward flow of gas between open vertical spaces formed between the different heights of said chimney hat means, said chimney hat means designed to collect said downwardly flowing liquid on said upper surface and to direct the collected liquid toward said peripheral interior wall surface of said column shell, thereby providing mixing of the collected downwardly flowing liquid and the liquid downwardly flowing on and near said interior surface of said column shell.

2. The device of claim 1 wherein said upper surface of said chimney hat means extends over at least about 50 percent of the cross-sectional area of said tray surface.

3. The device of claim 1 wherein said chimney hat means are generally horizontal and extend generally from about one to an other side of said tray.

4. The device of claim 1 wherein said chimney hat means have a width which extends toward each adjacent chimney hat means, with small spaces, of less than about six inches, in between to permit the upward movement of a gas.

5. The device of claim 1 wherein said chimney hat means are generally horizontal and are arranged in generally alternating selected vertical heights above said plurality of gas risers.

6. The device of claim 1 wherein said chimney hat means have upward, generally parallel opposing side edges and open ends at said first and second end.

7. The device of claim 1 wherein said chimney hat means has a generally central, raised section to direct liquid toward said vertical interior surface of said column shell.

8. The device of claim 1 wherein the chimney hat means have a difference in vertical height of about 3 to 12 inches.

9. The device of claim 1 wherein said chimney hat means are adjacent to each other and inclined from the general horizontal plane to collect downwardly flowing liquid and to direct said liquid by gravity toward said first or said second end.

10. The device of claim 9 wherein at least some adjacent chimney hat means are inclined in opposite directions.

11. In a method of collecting and distributing liquid in a gas-liquid exchange column, which method comprises:
   a) introducing a downwardly flowing liquid into an upper section of an exchange column, having an internal wall surface;
   b) introducing an upwardly flowing gas into a lower section of the column;
   c) placing at least one tray with a tray surface having a cross-sectional tray surface area, between the downwardly flowing liquid and the upwardly flowing gas;
   d) providing a plurality of gas riser means for the upward flow of the gas through the tray;
   e) collecting the downwardly flowing liquid on the tray surface;
   f) providing a plurality of distributors to distribute generally uniformly across the cross-sectional area of the tray to the next lower section of the column liquid collected on the tray surface;
   g) withdrawing the upwardly flowing gas from the upper section of the column; and
   h) withdrawing collected and distributed downwardly flowing liquid from the lower section of the column, the improvement which comprises:
      i) placing a plurality of chimney hat means having an upper surface and one and the other end above and spaced apart from the plurality of gas risers and positioned at different vertical heights above said gas risers to protect the gas risers from downwardly flowing liquid and to permit the upward flow of gas between open vertical spaces formed between the different vertical heights;
      ii) extending the widths of the chimney hat means beyond the widths of the gas riser means to cover at least 30 percent of the cross-sectional area of the tray surface without restricting the upward flow of gas in the column; and
      iii) collecting downwardly flowing liquid on the upper surfaces of the chimney hat means, and directing the collected liquid in the upper surfaces to flow away from the point of liquid collection and toward the internal wall surface of the column shell to promote horizontal mixing of the collected liquid on the tray surface and to reduce liquid concentration gradient on the tray surface.

12. The method of claim 11 which includes inclining at least one of the chimney hat means from the horizontal axis of the column to direct collected liquid on the surface of the chimney hat means to flow by gravity toward the internal surface of the column shell.

13. The method of claim 11 which includes employing chimney hat means which are generally horizontal and arranging the surfaces of the horizontal chimney hat means at alternating different vertical heights to provide vertical spaces between the chimney hat means to permit the upward flow of gas through the vertical spaces.

14. The method of claim 11 wherein the chimney hat means covers at least about 70 per cent of the cross-sectional area of the tray surface.

15. The method of claim 11 which includes extending the width of the chimney hat means toward each other to provide a horizontal spacing of less than about 12 inches.

16. An integral collector-distributor device adapted for use in a gas-liquid exchange column to promote radial mixing of a liquid on a tray surface, which collector-distributor device comprises:
   a) a tray having a tray surface with a cross-section tray surface area and adapted to extend generally horizontally across the cross-sectional area of the column to collect downwardly flowing liquid;
   b) a plurality of gas riser means on the tray to permit the upward movement of an upwardly flowing gas through the tray;
   c) a plurality of liquid distributors to permit the generally uniform distribution of the collected downwardly flowing liquid on the tray surface to a lower section of the column; and
   d) a plurality of chimney hat means having an upper surface and a one and other end and extending over and above at least a portion of the gas riser means, wherein the hat means comprise a generally elongated chimney hat means arranged in an alternating arrangement sequentially across the tray surface to promote the mixing of liquid on the tray surface by an alternating flow between a one side and an other side of the column or the one or other side of the column and the center of the column, and wherein the hat means are angularly inclined from the horizontal, the chimney hat means having a width which extends beyond the width of the gas riser means to cover at least a major portion of the cross-sectional area of the tray surface to collect downwardly flowing liquid on the upper surface and to permit the collected liquid on the upper surface to flow by gravity away from the point of liquid collection toward the internal wall surface of the column shell to promote liquid mixing across the tray surface and to reduce liquid concentration gradients on the tray surface, without restricting the upward flow of gas in the column.

17. The device of claim 16 wherein the liquid distributor comprises a plurality of holes in the tray surface.

18. The device of claim 16 wherein the chimney hat means comprise generally elongated troughs extending substantially across the diameter of the column from one to the other side thereof and which has a generally high central peak section which provides for the gravity flow of collected liquid on the upper surface outwardly from the peak section on either side thereof.

19. The device of claim 16 wherein at least two chimney hat means have upper surfaces at different selected vertical heights.

20. The device of claim 16 wherein the liquid collector-distributor means comprise a plurality of generally parallel, spaced-apart lateral channels extending substantially across the cross-section of the column and extending below the tray surface and including means to distribute liquid collected therein to a lower section of the column.

21. The device of claim 20 which includes a central channel liquid distributor extending substantially across the diameter of the column and wherein the lateral channels are connected to, and arranged generally perpendicular to, the central channel to permit the liquid flow between the lateral channels and the central distributor.

22. The device of claim 20 wherein the lateral channels are generally rectangular and wherein the gas riser means comprise a plurality of spaced-apart, generally parallel, generally rectangular gas risers upwardly extending through the tray, the downwardly extended lateral channels alternating across the tray with the upwardly extended gas risers.

23. A collector-distributor device for use in a fluid exchange column, said column having an interior vertical surface and a horizontal cross-sectional area, to promote radial mixing of liquid on a tray surface without impeding upward gas flow, which device comprises:

a) a tray having a tray surface arranged and constructed to extend generally horizontally across said cross-sectional area of said column, to collect downwardly flowing liquid on said tray surface prior to its being distributed to a lower section of the column;

b) a plurality of gas riser means on said tray and covering a minor portion of said cross-sectional area of said tray surface, to provide for the upward movement of an upwardly flowing gas in said column and through said tray;

c) liquid distributor means to provide for the generally uniform distribution of said liquid on said tray surface to a lower section of said column;

d) chimney hat means having a first and second end and an upper surface to collect and distribute downwardly flowing liquid on said upper surface, said chimney hat means extending over said plurality of gas risers and generally vertically spaced apart therefrom;

e) said tray surface having the collected liquid on the tray surface to be distributed to a lower section of the column, comprising:

i) downwardly flowing liquid directly collected on the tray surface;

ii) downwardly flowing liquid collected and distributed onto the tray surface by chimney hat means; and iii) downwardly flowing liquid on the tray surface from the interior surface of the column shell; and f) said chimney hat means which are generally horizontal and extend generally from about one to an other side of said tray, and having widths which extend beyond the widths of said underlying gas risers and extending toward adjacent chimney hat means, where the small spaces between chimney hat means totals between one-third and three times the cross-sectional area of the gas risers, to provide for said upper surfaces of said chimney hats to cover at least a portion of said liquid collecting means and to cover at least 50 percent of said cross-sectional area of said tray surface, said chimney hat means placed at different, generally vertical heights above said gas risers to permit the upward flow of gas between said vertical spaces formed between the different heights of said chimney hat means and designed to collect said downwardly flowing liquid on said upper surface and to direct the collected liquid toward said peripheral interior surface of said column shell, to provide mixing of the collected downwardly flowing liquid and the liquid downwardly flowing on and near said interior surface of said column shell.

\* \* \* \* \*